United States Patent [19]

Imahashi

[11] Patent Number: 5,777,018

[45] Date of Patent: Jul. 7, 1998

[54] LOW-TEMPERATURE-RESISTANT, HALOGEN-FREE, FLAME RETARDANT POLYOLEFIN-BASED RESIN COMPOSITION

[75] Inventor: Takeshi Imahashi, Nagao-machi, Japan

[73] Assignee: Kyowa Chemical Industry Co., Ltd., Kagawa-ken, Japan

[21] Appl. No.: 606,056

[22] Filed: Feb. 23, 1996

[30] Foreign Application Priority Data

Mar. 7, 1995 [JP] Japan .................... 7-072459

[51] Int. Cl.$^6$ .............. C08K 3/22; C08K 5/098; C09K 21/02; C09K 21/06
[52] U.S. Cl. .............. 524/397; 524/394; 524/399; 524/400; 524/904; 528/486; 528/489; 252/609
[58] Field of Search ............... 523/200, 205, 523/210; 524/140, 141, 143, 394, 397, 399, 400, 439, 584, 586, 650, 779, 904; 528/489, 486; 252/609

[56] References Cited

U.S. PATENT DOCUMENTS

| | | | |
|---|---|---|---|
| 4,154,718 | 5/1979 | Miyata et al. | 524/408 |
| 4,198,486 | 4/1980 | Mylich et al. | 521/79 |
| 4,396,730 | 8/1983 | Imahashi | 523/200 |
| 4,544,685 | 10/1985 | Hoelzer | 523/200 |
| 4,671,896 | 6/1987 | Hasegawa et al. | 252/609 |
| 5,139,875 | 8/1992 | Metzemocher et al. | 428/403 |
| 5,151,459 | 9/1992 | Miyata et al. | 523/200 |
| 5,401,442 | 3/1995 | Miyata | 252/609 |
| 5,422,092 | 6/1995 | Miyata | 423/635 |

*Primary Examiner*—Joseph D. Anthony
*Attorney, Agent, or Firm*—Wenderoth, Lind & Ponack

[57] ABSTRACT

A halogen-free flame-retardant polyolefin resin composition which can give a molded article improved in low-temperature resistance and surface whitening resistance and improved in flame retardancy and melt index, and an expansion-molded article having uniform and fine gas bubbles without large-sized gas bubbles, the halogen-free flame-retardant polyolefin-based resin composition containing a polyolefin resin, a dihydric or trihydric metal hydroxide surface-treated with a saturated fatty acid, or, when the metal hydroxide is aluminum hydroxide, aluminum hydroxide surface-treated with a saturated or specific unsaturated fatty acid or an alkali metal salt thereof, and an aluminum salt of an unsaturated fatty acid having 10 to 30 carbon atoms.

6 Claims, No Drawings

5,777,018

1

LOW-TEMPERATURE-RESISTANT, HALOGEN-FREE, FLAME RETARDANT POLYOLEFIN-BASED RESIN COMPOSITION

BACKGROUND OF THE DISCLOSURE

1. Field of the Invention

The present invention relates to a halogen-free flame-retardant polyolefin-based resin composition improved in low-temperature resistance (cold weather resistance). More specifically, it relates to a halogen-free flame-retardant polyolefin-based resin composition which is free from a surface whitening phenomenon and which is improved in flame retardancy and melt index and is also improved in low-temperature resistance. Further, the present invention relates to an expansion-molded article of the above resin free of large-sized gas bubbles.

2. Description Art of Related

Polyolefin resins are easily combustible themselves. It is therefore necessary to impart polyolefin resins with flame retardancy for preventing various calamities caused by fire, etc., and a variety of proposals have been hitherto made. One proposal is concerned with a flame-retardant polyolefin-based resin composition obtained by incorporating an organic halide or a combination of an organic halide and antimony trioxide into a polyolefin resin.

However, the problem of the above resin composition is that it corrodes a molding machine when molded. Further, it generates a large volume of smoke in fire, and the smoke is toxic and corrosive. For overcoming these problems, there has been proposed a method in which a flame-retardant polyolefin-based resin composition is provided by incorporating a large amount of a halogen-free safe flame-retardant such as magnesium hydroxide or aluminum hydroxide into a polyolefin resin. This method is disclosed in many publications such as JP-A-50-119848, JP-A-53-12943, JP-A-54-77658, JP-B-57-10898, JP-A-60-243155 and U.S. Pat. No. 4,396,730

A polyolefin-based resin composition obtained by incorporating a large amount of metal hydroxide into a polyolefin resin satisfies the practical use level requirements of mechanical strength at room temperature (ordinary temperature), and causes almost no problem when used in a warm environment. However, this polyolefin-based resin composition has a problem on low-temperature resistance since it shows a great decrease in mechanical strength, particularly impact strength, when used at a low temperature. That is, the polyolefin-based resin composition has a problem in that it is embrittled in a low-temperature environment so that the use thereof in such an environment is unacceptable or impossible.

The term "low-temperature resistance" in the present specification specifically means the following. A resin composition having "low-temperature resistance" refers to a resin composition which shows almost no decrease in impact resistance such as Izod impact strength and du Pont impact strength when used at a low temperature such as a temperature below the freezing point, or which shows a sufficiently low brittle temperature in a brittle temperature test. A material having no low-temperature resistance is embrittled and unsuitable as a material for use in a low-temperature environment such as a cold district or an extremely cold district.

However, the above publications on flame-retardant polyolefin-based resin compositions do not recognize anything concerning the need for improvement in low-temperature resistance, and naturally, those publications describe nothing concerning low-temperature resistance. The properties of a polyolefin-based resin composition differ depending upon whether or not a metal hydroxide incorpo-

2 rated as a flame retardant is surface treated. The meta hydroxide which is not surface-treated has poor compatibility with a polyolefin resin so that it cannot be homogeneously dispersed in the resin. As a result, a mixture of these shows a low melt index, and a molded article of the mixture (composition) is very poor in toughness low-temperature resistance and flame retardancy. Further, when the metal hydroxide is other than aluminum hydroxide, a composition of these shows a high surface whitening phenomenon.

On the other hand, a surface-treated metal hydroxide not only has excellent compatibility with a polyolefin resin but also has excellent dispersibility in polyolefin resin. Therefore, a mixture of a surface-treated metal hydroxide and a polyolefin resin has a greatly improved melt index, and a molded article thereof has excellent toughness at room temperature. Further, the surface whitening phenomenon of a molded article of a mixture containing a surface-treated metal hydroxide other than aluminum hydroxide and a polyolefin resin is considerably inhibited when some surface-treating agents are selected. However, the low-temperature resistance and flame retardancy of these compositions is still at low levels.

Further, the expansion molding method has a problem in that large-sized gas bubbles occur so that it is difficult to obtain an expansion-molded article having uniform and fine gas bubbles.

JP-A-50-119848 discloses a self-distinguishing resin composition which is improved in melt index for easy injection molding, by incorporating, as a lubricant, a salt of a fatty acid having 8 to 20 carbon atoms and a metal such as aluminum, zinc, magnesium or calcium into a self-distinguishing polyolefin-based resin composition containing magnesium hydroxide. However, JP-A-50-119848 mentions nothing concerning the surface treatment of the magnesium hydroxide, and does it describe anything concerning the low-temperature resistance of the self-distinguishing resin composition as an end product. The self-distinguishing resin composition actually has a very low level of low-temperature resistance, and its flame retardancy is also poor.

JP-A-53-12943 discloses that a polyolefin-based flame-retardant resin composition of which the flame retardancy, toughness and injection moldability are well-balanced and excellent can be obtained by incorporating metal soap as a lubricant and an alkali metal salt of an organic carboxylic acid as a flame retardant aid into a flame-retardant polyolefin-based resin composition containing magnesium hydroxide. However, JP-A-53-12943 does not mention anything concerning the surface treatment of the magnesium hydroxide, nor does it describe anything concerning the low-temperature resistance and the surface whitening phenomenon of the polyolefin-based flame-retardant resin composition. This resin composition actually has the following problems. It has poor low-temperature resistance, the surface whitening phenomenon is intensified by adding an alkali metal salt of an organic carboxylic acid, and a molded article obtained therefrom is degraded in appearance. JP-A-53-12943 uses Izod impact strength values according to ASTM D-256 for toughness evaluation. ASTM D-256 is a method in which Izod impact strength is measured at a temperature of 23° C. ±2°C. A flame-retardant polyolefin-based resin composition according to JP-A-53-12943 shows a high Izod impact strength value at room temperature, while it shows a very low one at a temperature below the freezing point. Further, the alkali metal salt of an organic carboxylic acid does not show the flame retardant aid effect as much as that described in JP-A-53-13943. The melt tension of the flame-retardant polyolefin-based resin composition is very low. As a result, strands thereof easily break when processed with a resin processing machine such as an extruder, and it is very difficult to continuously process it with a pelletizer.

U.S. Pat. No. 4,396,730 discloses a flame-retardant thermoplastic resin composition containing magnesium hydroxide surface-treated with an alkali metal salt of oleic acid as a flame retardant and a magnesium oleate or aluminum oleate as a flame retardant aid. U.S. Pat. No. 4,396,730 seeks to provide a resin composition which has excellent moldability and gives a molded article having improved flame retardancy, an excellent appearance and excellent strength. However, it pays no attention to the surface whitening phenomenon. That is, the surface whitening phenomenon cannot be avoided when an alkali metal salt of oleic acid is used, and the alkali metal salt of oleic acid is nevertheless used for surface-treatment of magnesium hydroxide. For this reason, the resin composition of U.S. Pat. No. 4,396,730 has a defect in that a molded article therefrom suffers a surface whitening phenomenon to a great extent. Further, U.S. Pat. No. 4,396,730 describes nothing concerning the low-temperature resistance of the resin composition.

JP-A-54-77658 discloses a resin composition obtained by incorporating polyvinyl acetate or an ethylene-vinyl acetate copolymer as a flame retardant aid into a flame-retardant olefin polymer containing magnesium hydroxide. However, JP-A-54-77658 describes nothing concerning the low-temperature resistance. The resin composition has an effect on the inhibition of glowing to some extent, but shows no improvement in low-temperature resistance.

JP-B-57-10898 discloses a resin composition obtained by incorporating a carbon powder such as carbon black, as a flame retardant aid, into a self-distinguishing thermoplastic resin composition containing magnesium hydroxide. The disclosed resin composition shows some improvement in flame retardancy, but shows no improvement in low-temperature resistance. Further, JP-B-57-10898 describes nothing concerning the low-temperature resistance.

JP-A-60-243155 seeks to achieve excellent moldability and excellent appearance, physical properties and flame retardancy of a molded article by incorporating a specific magnesium hydroxide into a thermoplastic resin. The specific magnesium hydroxide refers to a magnesium hydroxide having excellent dispersibility and non-aggregation properties and having a BET specific surface area of 20 $m^2/g$ or less and a BET specific surface area/Blaine permeability method specific surface area ratio of 1–3. However, JP-A-60-243155 does not at all mention the low-temperature resistance, and no composition according to JP-A-60-243155 is satisfactory in low-temperature resistance.

As explained above, no prior art documents seek to improve the low-temperature resistance, nor are the compositions according to the prior art documents are satisfactory in the improvement of low-temperature resistance. For providing a flame-retardant polyolefin resin composition practically suited for use in a low-temperature environment, it is required to accomplish all of low-temperature resistance, surface whitening resistance, flame retardancy and an adequate melt index at the same time.

In the expansion-molding method, further, it is required to provide an expansion-molded article having uniform and fine gas bubbles without large-sized gas bubbles. The large-sized gas bubbles decrease the strength and heat insulation of the resin.

SUMMARY OF THE INVENTION

It is an object of the present invention to provide a halogen-free flame-retardant polyolefin resin composition which can give a molded article improved in low-temperature resistance, and a molded article formed therefrom.

It is another object of the present invention to provide a halogen-free flame-retardant polyolefin resin composition which can give a molded article improved in low-temperature resistance and surface whitening resistance and improved in flame retardancy and melt index.

It is further another object of the present invention to provide an expansion-molded article having uniform and fine gas bubbles without large-sized gas bubbles by an expansion-molding method.

According to the present invention, the above objects and advantages of the present invention are achieved by a low-temperature-resistant halogen-free flame-retardant polyolefin-based resin composition containing (a) 100 parts by weight of a polyolefin resin, (b) 15 to 250 parts by weight of a dihydric or trihydric metal hydroxide surface-treated with a saturated fatty acid having 10 to 30 carbon atoms or an alkali metal salt thereof, or, when the metal hydroxide is aluminum hydroxide, 15 to 250 parts by weight of aluminum hydroxide surface-treated with a saturated or unsaturated fatty acid having 10 to 30 carbon atoms or an alkali metal salt thereof, and (c) 0.1 to 10 parts by weight of an aluminum salt of an unsaturated fatty acid having 10 to 30 carbon atoms.

Further, according to the present invention, there is provided a molded article formed from the above flame-retardant polyolefin-based resin composition.

DETAILED DESCRIPTION OF THE INVENTION

The present inventor has found that the poor low-temperature resistance of conventional halogen-free flame-retardant polyolefin-based resin compositions can be overcome to a great extent by incorporating a dihydric or trihydric metal hydroxide surface-treated with a specific fatty acid or its alkali metal salt and an aluminum salt of a specific unsaturated fatty acid into a halogen-free polyolefin resin, so that the so-obtained polyolefin-based resin composition is improved in flame retardancy and melt index, a molded article formed from the so-obtained polyolefin-based resin composition is almost free of a surface whitening phenomenon and that the above composition gives an excellent expansion-molded article by an expansion molding method. Based on these finding, the present invention has been completed.

The halogen-free polyolefin resin used in the present invention includes olefin homopolymers such as polypropylene, high-density polyethylene, low-density polyethylene, ultralow-density polyethylene, linear low-density polyethylene, polybutene-1 and poly-4-methylpentene-1; and olefin copolymers including copolymers composed of ethylene and other monomer such as an ethylene-propylene copolymer, an ethylene-vinyl acetate copolymer, an ethylene-ethyl acrylate copolymer, an ethylene-butene-1 copolymer and an ethylene-propylene diene terpolymer. These resins may be used alone or in combination.

The metal hydroxide used in the present invention is a dihydric or trihydric metal hydroxide and includes magnesium hydroxide, aluminum hydroxide, calcium hydroxide and calcium aluminate hydrate. Further, the dihydric or trihydric metal hydroxide may be a composite metal hydroxide which is a solid solution in which at least one of nickel, cobalt, manganese, iron, copper and zinc is dissolved in any one of the above metal hydroxides. The dihydric or trihydric metal hydroxide may be any one of natural and synthetic products.

The average secondary particle diameter of the metal hydroxide used in the present invention is preferably in the range of from 0.1 to 10 μm, more preferably 0.3 to 6 μm When the average secondary particle diameter is within the above range, the flame-retardant polyolefin-based resin composition has excellent mechanical strength and a molded article therefrom has an excellent appearance. When the average secondary particle diameter of the metal hydroxide is outside the above range, undesirably, the above properties are poor and the resin composition is poor in processability.

When the metal hydroxide other than aluminum hydroxide is used, the metal hydroxide is surface-treated with a saturated fatty acid having 10 to 30 carbon atoms or an alkali metal salt thereof. When aluminum hydroxide is used, no surface whitening phenomenon is involved, and the aluminum hydroxide may be surface-treated with any one of the above saturated fatty acid and an unsaturated fatty acid having 10 to 30 carbon atoms. This surface treatment of the metal hydroxide enhances the compatibility between the metal hydroxide and the polyolefin resin, improves the processability of the resin composition, inhibits the surface whitening phenomenon and improves the low-temperature resistance.

The amount of the fatty acid or its alkali metal salt for the above surface treatment, per 100 parts by weight of the metal hydroxide, is preferably 0.1 to 10 parts by weight, more preferably 0.2 to 5 parts by weight. When the metal hydroxide is surface-treated with an alkali metal salt, and when the metal hydroxide is other than aluminum hydroxide, it is preferred in view of the inhibition of a surface whitening phenomenon to sufficiently wash the surface-treated metal hydroxide with water or warm water such that the amount of the alkali metal remaining in the resultant surface-treated metal hydroxide is preferably not more than 800 ppm, more preferably not more than 400 ppm.

The term "surface whitening phenomenon" in the present invention refers to the following phenomenon. When a molded article of a flame-retardant polyolefin-based resin composition containing, for example, magnesium hydroxide is placed in an atmosphere of air having a high humidity, magnesium hydroxide reacts with carbonic acid formed from water and carbon dioxide gas to form magnesium carbonate and leaves a dent (concave portion) having a magnesium hydroxide particle size in the molded article surface by its elution. This in turn, causes visual light to be scattered and the molded article surface to look white. Another cause is that crystal of magnesium carbonate is deposited on the molded article surface and the molded article surface looks white. When aluminum hydroxide which does not react with a weak acid such as carbonic acid is used, this phenomenon does not take place.

The surface whitening phenomenon greatly hampers the surface appearance of a molded article and degrades the product value of the molded article. The inhibition of the surface whitening phenomenon has been a serious problem of a molded article obtained from a flame-retardant polyolefin-based resin composition containing a metal hydroxide and magnesium hydroxide in particular.

The surface treating agent used in the present invention is a saturated or unsaturated fatty acid having 10 to 30 carbon atoms or an alkali metal salt thereof. The saturated fatty acid includes stearic acid, behenic acid, capric acid, undecanoic acid, lauric acid, myristic acid, arachic acid, lignoceric acid, cerotic acid, montanic acid and melissicacid. The unsaturated fatty acid include soleic acid, erucic acid, obtusilic acid, caproleic acid, undecylenic acid, linderic acid, tsuzuic acid, physeteric acid, myristoleic acid, palmitoleic acid, petroselinic acid, elaidic acid, cis-II-octadecenoic acid, vaccenic acid, gadoleic acid, cis-II-eicosenoic acid, cetoleic acid, brassidic acid, selacholeic acid, ximenic acid, lumequeic acid, linoleic acid and linolenic acid. The alkali metal includes lithium,potassium and sodium.

The amount of the metal hydroxide surface-treated with the above surface treating agent, per 100 parts by weight of the polyolefin resin, is in the range of 15 to 250 parts by weight. When the amount of the above surface-treated metal hydroxide is less than the above lower limit, the flame retardancy is insufficient. When the above amount is greater than the above upper limit, the polyolefin based resin composition shows practically insufficient mechanical strength.

The flame retardant aid suitable for use in the present invention includes carbon powders such as carbon black, activated carbon and graphite; phosphorus-containing compounds such as red phosphorus, ammonium polyphosphate, triphenyl phosphate, trixylyl phosphate and xylenyl diphenyl phosphate; transition metal compounds such as nickel oxide, cobalt oxide, manganese oxide, iron oxide, copper oxide, zinc oxide, zirconium oxide, vanadium oxide, Titan Yellow pigment, zirconium silicate, molybdenum oxide, zinc molybdate, zinc stannate and tin oxide; and organic fibers which are carbonized at a high temperature such as an acrylic fiber and a novoloid fiber. The flame retardant aid may be surface-treated as required.

The amount of the above flame retardant aid, per 100 parts by weight of the polyolefin resin, is in the range of 0 to 30 parts by weight. When the amount of the flame retardant aid is greater than 30 parts by weight, the mechanical strength of the polyolefin-based resin composition is decreased to a practically inadequate level, and such an amount is uneconomical.

In the aluminum salt of an unsaturated fatty acid used in the present invention, the unsaturated fatty acid preferably has 10 to 30 carbon atoms. The unsaturated fatty acid includes oleic acid, erucic acid, obtssilic acid, . caproleic acid, undecylenic acid, linderic acid, tsuzuic acid, physeteric acid, myristoleic acid, palmitoleic acid, petroselinic acid, elaidic acid, cis-II-octadecenoic acid, vaccenic acid, gadoleic acid, cis-II-eicosenoic acid, cetoleic acid, brassidic acid, selacholeic acid, ximenic acid, lumequeic acid, linoleic acid and linolenic acid. The aluminum salt of an unsaturated fatty acid used in the present invention includes mono-, di- and tri-aluminum salts of unsaturated fatty acids. The sealuminum salts maybe used alone or in combination. The aluminum salt of an unsaturated fatty acid can be selected from those synthesized by known synthesis methods such as a reaction between an aqueous solution of an unsaturated fatty acid metal salt and aluminum inorganic acid salt and a reaction between aluminum alkoxide and an unsaturated fatty acid in a non-aqueous solvent. The non-aqueous solvent includes ethanol and benzene.

The aluminum salt of an unsaturated fatty acid is a rubbery and massive substance, and is difficult to process with a processing machine such as a resin extruder without any modification. It is therefore preferred to mix the aluminum salt of an unsaturated fatty acid with the metal hydroxide or the flame retardant aid used in the present invention with a mixer or a kneader for powders and knead them to form a powder or particles.

The amount of the aluminum salt of an unsaturated fatty acid, per 100 parts by weight of the polyolefin resin, is preferably 0.1 to 10 parts by weight, more preferably 0.5 to 10 parts by weight. When the amount of the aluminum salt of an unsaturated fatty acid is smaller than the above lower limit, the effect on the improvement of low-temperature resistance is insufficient. When the above amount is greater than the above upper limit, a gummy substance is liable to adhere to the top of a die when the halogen-free flame-retardant polyolefin-based resin composition of the present invention is produced with a processing machine such as an extruder.

The main function/effect of the aluminum salt of an unsaturated fatty acid is to improve the low-temperature resistance, and further, the aluminum salt of an unsaturated fatty acid has a function and an effect as an improver of flame retardancy (flame retardant aid) and a lubricant.

The method of mixing the polyolefin resin, the metal hydroxide, the flame retardant aid and the aluminum salt of an unsaturated fatty acid is not specially limited, and any means can be employed if these components can be homogeneously mixed. For example, there can be employed a method in which the above components and other additive (s) are mixed in advance and the mixture is melt-kneaded with an open roll, a single-screw or twin-screw extruder or a Banbury mixer. The method of molding the so-obtained composition is not specially limited, either. For example, the composition can be molded by any one of an injection molding method, an extrusion method, a blow molding method, a press forming method, a rotary molding method, a calender forming method and a sheet forming method.

The flame-retardant polyolefin-based resin composition of the present invention may contain a variety of additives, reinforcement materials and fillers which are generally used. Examples of these additives, reinforcement materials and fillers include an antioxidant, an ultraviolet absorbent, a photostabilizer, a metal deactivating agent, a crosslinking agent, a colorant, a curing agent, a nucleating agent, a foaming agent, a deodorant, lithopone, clay, a wood powder, a glass fiber, ferrite, talc, mica, wollastonite, calcium carbonate, fibrous magnesium hydroxide, fibrous basic magnesium sulfate, a metal fiber and a metal powder.

The present invention will be explained with reference to Examples hereinafter, in which "part" and "%" stand for "part by weight" and "% by weight" unless otherwise specified. Methods of measurements of an average secondary particle diameter, low-temperature resistance, melt index, flame retardancy, surface whitening phenomenon, BET specific surface area, Blaine permeability method specific surface area and expandability of expansion-molded article in Examples are as follows.

<Average Secondary Particle Diameter>

Magnesium hydroxide and aluminum hydroxide were measured with a microtrack supplied by Leeds & Northrup Instruments Company.

<Low-Temperature Resistance>

Test pieces from a composition containing polypropylene and test pieces from a composition containing high-density polyethylene were allowed to stand at −20° C. for 48 hours and then measured for a du Pont impact strength and an Izod impact strength according to JIS K7110. In the du Pont impact strength measurement, the test pieces had the form of a disk having a diameter of 50 mm and a thickness of 2.1 mm, and an energy value when half of the test pieces cracked was taken as a du Pont impact value.

Test pieces from a composition containing an ultralow density polyethylene and test pieces from a composition containing an ethylene-vinyl acetate copolymer (to be referred to as "EVA" hereinafter) were measured for a brittle temperature at a low temperature by the brittle temperature test according to JIS K7216.

<Melt Index>

Measured according to JIS K7210. Test pieces from a composition containing polypropylene and test pieces from a composition containing high-density polyethylene were measured at 230° C. under a load of 2.16 kg. Test pieces from a composition containing an ultralow-density polyethylene were measured at 190° C. under a load of 2.16 kg. Test pieces from a composition containing EVA were measured at 125° C. under a load of 2.16 kg.

<Flame Retardancy>

Test pieces having a thickness of ⅛inch or 1/12inch were measured according to the UL94VE method.

<Surface Whitening Phenomenon>

A test piece having a thickness of ⅛inch, the same as the test piece prepared for the test according to the UL94VE method, was completely immersed in 500 ml of ion-exchanged water and kept in the water at 24° C. for 48 hours with introducing carbon dioxide gas into the water. Thereafter, the degree of surface whitening was visually evaluated on the basis of the following ratings.

Class 1: No surface whitening phenomenon

Class 2: Almost no surface whitening phenomenon is observed.

Class 3: A surface whitening phenomenon is observed only slightly.

Class 4: A surface whitening phenomenon is observed to some extent.

Class 5: A surface whitening phenomenon is observed on several parts on the surface.

Class 6: A surface whitening phenomenon is observed on many parts on the surface.

Class 7: A surface whitening phenomenon is observed on a large area.

Class 8: A surface whitening phenomenon is observed all over the surface.

A test piece coming under class 4 to class 1 means that the test piece has the practical capability of preventing the surface whitening phenomenon, and a test piece coming under class 3 to class 1 is particularly preferred.

<BET Specific Surface Area>

Measured according to the method described in "Catalyst" (Vol. 2, No. 4,473, 1960, written by Tokuji Takagi).

<Blaine Permeability Method Specific Surface area>

A sample was measured according to JIS R5201-1964 on an assumption that the sample had a porosity of 0.714.

<Expandability of Expansion-Molded Article>

An expansion-molded article was cut or fracture (bronken), and gas bubbles were measured for sizes while the cut or fractured surfacewere observed through a precision ruler, a magnifying glass or an optical microscope.

EXAMPLES 1–5 AND COMPARATIVE EXAMPLES 1–14

TABLE 1

|  | Polypropylene, Amount | Mg hydroxide Surface-treated with | Amount | Flame retardant aid | Amount | Improver for low temperature resistance | Amount |
|---|---|---|---|---|---|---|---|
| Ex.1 | 100 | Na stearate | 130 | No | — | Al oleate | 3 |
| CEx.1 | 100 | " | 130 | No | — | No | — |
| CEx.2 | 100 | " | 150 | No | — | No | — |
| CEx.3 | 100 | No | 130 | No | — | No | — |
| CEx.4 | 100 | No | 150 | No | — | No | — |
| CEx.5 | 100 | No | 130 | No | — | Mg stearate | 3 |
| CEx.6 | 100 | No | 130 | Na stearate | 7 | Al distearate | 7 |

TABLE 1-continued

| | Poly-propy-lene, Amount | Mg hydroxide Surface-treated with | Amount | Flame retardant aid | Amount | Improver for low temperature resistance | Amount |
|---|---|---|---|---|---|---|---|
| CEx.7 | 100 | No | 130 | No | — | Al oleate | 3 |
| CEx.8 | 100 | Na Oleate | 130 | No | — | " | 3 |
| CEx.9 | 100 | Na stearate | 130 | EVA | 3 | No | — |
| CEx.10 | 100 | No Mg | 0 | No | — | No | — |
| Ex.2 | 100 | Na stearate | 110 | Carbon black | 3 | Al oleate | 3 |
| CEx.11 | 100 | " | 110 | " | 3 | No | — |
| Ex.3 | 100 | " | 30 | A,B,C | | Al oleate | 3 |
| Ex.4 | 100 | " | 45 | A,B,C | | " | 5 |
| Ex.5 | 100 | " | 50 | A,B,C | | " | 1 |
| CEx.12 | 100 | " | 30 | A,B,C | | No | — |
| CEx.13 | 100 | " | 45 | A,B,C | | No | — |
| CEx.14 | 100 | " | 50 | A,B,C | | No | — |

Notes: Ex. = Example, CEx. = Comparative Example, A = 10 parts by weight of red phosphorus, B = 5 parts by weight of carbon black, C = 1 parts by weight of acrylic fiber Components shown in Table 1 in amounts shown in Table 1, 0.25 part, per 100 parts of the polypropylene, of "DLTP" (supplied by Yoshitomi Pharmaceutical Co., ltd.) as an antioxidant and 0.25 part, per 100 part of the polypropylene, of "Irganox 1010" (supplied by Ciba Geigy AG) as an antioxidant were mixed in advance, and the mixture was melt-kneaded at 230° C. with a single-screw extruder to prepare pellets having a size of about 3 mm. Part of pellets were measured for a melt index, and the remaining pellets were injection-molded to prepare test pieces.

The polypropylene used in all of Examples 1~5 and Comparative Examples 1~14 was an impact-resistance grade product. The magnesium hydroxide was a synthetic product having a BET specific surface area of 8 $m^2/g$, a BET specific surface area/Blaine permeability method specific surface area ratio of 1.5 and an average secondary particle diameter of 0.7 μm. This magnesium hydroxide was prepared according to the method disclosed in JP-A-60-243155.

Comparative Examples 3~7 used the magnesium hydroxide which was not surface-treated.

Examples 1~5 and Comparative Examples 1, 2, 9 and 11~14 used the magnesium hydroxide surface-treated with 3 parts by weight, per 100 parts by weight of the magnesium hydroxide, of sodium stearate.

Comparative Example 8 used the magnesium hydroxide surface-treated with 2 parts by weight, per 100 parts by weight of the magnesium hydroxide, of sodium oleate.

In Examples 3~5 and Comparative Examples 12~14, the red phosphorus was "Novaexcel 140" supplied Rin Kagaku Kogyo K. K., the carbon black was FEF (fast extruding furnes), and the acrylic fiber was a copolymer which was formed from acrylonitrile and vinyl acetate and was in a 1.5 denier chopped strand state.

The carbon black used in Example 2 and Comparative Example 11 was the same as the above FEF.

The aluminum oleate used in Examples 1~5 and Comparative Examples 7 and 8 was obtained by a reaction between a sodium oleate aqueous solution and an aluminum chloride hexahydrate aqueous solution.

Comparative Example 5 used, as magnesium stearate, a reagent supplied by Wako Purechemical Industries, Ltd.

Comparative Example 6 used, as aluminum distearate, a reagent supplied by Wako Purechemical Industries, Ltd.

The EVA used in Comparative Example 9 had a vinyl acetate content of 20%.

The sodium stearate and the sodium oleate used as a surface treating agent were reagents for chemistry supplied by Wako Purechemcial Industries, Ltd.

Table 2 shows the test results.

TABLE 2

| | Low temperature resistance | | Surface whitening resistance Class | Melt Index g/10 minutes | | Flame retardancy UL94VE | |
|---|---|---|---|---|---|---|---|
| | Izd impact value | du Pont impact value | | | Thickness | Evaluation | |
| Ex.1 | 4.0 | 50 | 3 | 6.8 | 1/8 | V-0 | |
| CEx.1 | 1.9 | 10 | 3 | 4.0 | 1/8 | non-standardized | |
| CEx.2 | 1.4 | 5 | 3 | 3.7 | 1/8 | V-0 | |
| CEx.3 | 1.2 | ≦5 | 8 | 0.15 | 1/8 | non-standardized | |
| Ex.4 | 0.8 | ≦5 | 8 | 0.11 | 1/8 | V-0 | |
| CEx.5 | 1.5 | 10 | 3 | 3.6 | 1/8 | non-standardized | |
| CEx.6 | 1.9 | ≦5 | 8 | 6.2 | 1/8 | non-standardized | |
| CEx.7 | 1.8 | 5 | 8 | 3.6 | 1/8 | non-standardized | |
| CEx.8 | 4.2 | 55 | 8 | 6.4 | 1/8 | V-0 | |
| CEx.9 | 1.7 | 10 | 3 | 4.0 | 1/8 | non-standardized | |
| CEx.10 | 4.1 | 15 | 1 | 2.0 | 1/8 | non-standardized | |
| Ex.2 | 5.6 | 50 | 3 | 5.1 | 1/8 | V-1 | |
| CEx.11 | 2.0 | 10 | 3 | 2.9 | 1/8 | non-standardized | |
| Ex.3 | 3.1 | 25 | 2 | 3.4 | 1/8 | V-0 | |
| Ex.4 | 3.5 | 30 | 2 | 3.6 | 1/12 | V-0 | |
| Ex.5 | 3.0 | 25 | 2 | 3.1 | 1/12 | V-0 | |
| CEx.12 | 1.8 | ≦5 | 2 | 2.3 | 1/8 | non-standardized | |
| CEx.13 | 1.9 | ≦5 | 2 | 2.6 | 1/12 | non-standardized | |
| CEx.13 | 1.7 | ≦5 | 2 | 2.1 | 1/12 | non-standardized | |

Notes to Table 2: Ex. = Example, CEx. = Comparative Example, Unit of Izod impact value = kgf · cm/cm, Unit of du Pont impact value = kgf · cm, Unit of thickness = inch Notes to Table 2: Ex. =Example, CEx. =Comparative Example, Unit of Izod impact value =kgf.cm/cm, Unit of du Pont impact value =kgf.cm, Unit of thickness =inch The test results of Examples 1~5 were excellent concerning all of the tests such as surface whitening phenomenon, flame retardancy, low-temperature resistance and melt index, while the test results of Comparative Examples 1~14 were poor concerning at least one of the above tests.

EXAMPLE 6 AND COMPARATIVE EXAMPLE 15

TABLE 3

| | Polyolefin resin | Amount | Metal hydroxide Magnesium hydroxide surface-treated with | Amount | Improver for low-temperature resistance | Amount |
|---|---|---|---|---|---|---|
| Ex.6 | High-density polyethylene | 92 | Potassium behenate | 150 | Al erucate | 3 |
| | EVA | 8 | | | | |
| CEx.15 | High-density polyethylene | 92 | Potassium behenate | 150 | No | — |
| | EVA | 8 | | | | |

Ex. = Example, CEx. = Comparative Example

Components shown in Table 3 in amounts shown in Table 3 and 0.5 part, per 100 parts of the total of the high-density polyethylene (92 parts) and EVA (8 parts), of "Irganox 1010" as an antioxidant were mixed in advance, and the mixture was melt-kneased at 230° C. with a twin-screw extruder to prepare pellets having a size of about 3 mm. Part of the pellets were measured for a melt index, and the remaining pellets were extruded to prepare test pieces for various property tests except for the du Pont impact test, test pieces for which were prepared by compression molding. The high-density polyethylene was a product of an extrusion grade. EVA was a product having a vinyl acetate content of 20%. The magnesium hydroxide was a natural product having a purity of 91% and an average secondary particle diameter of 5.0 μm. The magnesium hydroxide was surface-treated with 2 part by weight, per 100 parts by weight of the magnesium hydroxide, of potassium behenate before use.

The aluminum erucate was prepared by a reaction of aluminum, alkoxide and erucic acid in ethanol.

Table 4 shows the results.

TABLE 4

| | Low temperature resistance | | Surface whitening resistance Class | Melt Index g/10 minutes | | Flame retardancy UL94VE | |
|---|---|---|---|---|---|---|---|
| | Izd impact value | du Pont impact value | | | Thickness | Evaluation | |
| Ex.6 | 6.2 | 60 | 3 | 2.0 | ⅛ | V-0 | |
| CEx.15 | 3.6 | 20 | 3 | 1.2 | ⅛ | non-standardized | |

Ex. = Example, CEx. = Comparative Example

As shown in Table 4, the result of the test for the low-temperature resistance in Example 6 is greatly improved over that in Comparative Example 15, and the results of the tests for flame retardancy and melt index are also greatly improved over those in Comparative Example 15. Further, the molded article in Example 6 showed a surface whitening phenomenon only slightly, and it is therefore seen that the composition in Example 6 is practically suitable for use in a low-temperature environment.

EXAMPLE 7 AND COMPARATIVE EXAMPLE 16

TABLE 5

| | Polyolefin resin | Amount | Metal hydroxide Aluminum hydroxide surface-treated with | Amount | Improver for low-temperature resistance | Amount |
|---|---|---|---|---|---|---|
| Ex. 7 | Ultralow-density polyethylene | 100 | Sodium oleate | 130 | Aluminum oleate | 3 |
| CEx. 16 | Ultralow-density polyethylene | 100 | Sodium oleate | 130 | No | — |

Ex. = Example, CEx. = Comparative Example

Components shown in Table 5 in amounts shown in Tabl 5 and 0.5 part, per 100 parts of the ultralow-densit polyethylene, of "Irganox 1010" as an antioxidant wer mixed in advance, and the mixture was melt-kneased at 190 C. with a single-screw extruder to prepare pellets having size of about 3 mm. Part of the pellets were measured for melt index, and the remaining pellets were compression molded to prepare test pieces for various property tests.

The ultralow-density polyethylene had a density of 0.9 and a melt index of 0.40 g/10 minutes. The aluminul hydroxide was a synthetic product having an average se ondary particle diameter of 1.15 μm. The aluminum hydro ide was surface-treated with 0.4 part by weight, per 100 par by weight of the aluminum hydroxide, of sodium olea before use. The aluminum oleate was the same as that use in Example 1.

Table 6 shows the results.

TABLE 6

| | Low temperature resistance | Surface whitening resistance | Melt Index | Flame retardancy UL94VE | |
|---|---|---|---|---|---|
| | Brittle temperature | Class | g/10 minutes | Thickness | Evaluation |
| Ex. 7 | −60° C. or lower | 1 | 0.25 | ⅛ | V-0 |
| CEx. 16 | −30° C. | 1 | 0.02 | ⅛ | non-standardized |

Ex. = Example, CEx. = Comparative Example

As shown in Table 6, the results of Example 7 are greatly improved over the results of Comparative Example 16 not only in flame retardancy but also in low-temperature resistance and melt index. The great improvement in melt index means that an ultralow-density polyethylene containing aluminum hydroxide, of which the processing with an extruder is impossible or very difficult, is improved in processability to such a level of melt index that it is easily processable.

EXAMPLE 8 AND COMPARATIVE EXAMPLE 17

TABLE 7

| | Polyolefin resin | Amount | Metal hydroxide Aluminum hydroxide surface-treated with | Amount | Improver for low-temperature resistance | Amount |
|---|---|---|---|---|---|---|
| Ex. 8 | EVA resin | 100 | Sodium palmitate | 130 | Aluminum oleate | 3 |
| CEx. 17 | EVA resin | 100 | Sodium palmitate | 130 | No | — |

Ex. = Example, CEx. = Comparative Example

Components shown in Table 7 in amounts shown in Table 7, 1 part, per 100 parts of the EVA resin, of "Irganox 1010" as an antioxidant and 0.5 part, per 100 parts of the EVA resin, of "DCP" (dicumyl peroxide, supplied by Sumitomo Chemical Co., Ltd.) were mixed in advance, and the mixture was melt-kneaded at 120° C. with a single-screw extruder to prepare pellets having a size of about 3 mm. Part of the pellets were measured for a melt index. The remaining pellets were pre-molded with a press-forming machine at 120° C. for 5 minutes and then crosslinked with the press-forming machine at 180° C. for 15 minutes, and test pieces for various property tests were prepared from the crosslinked product.

EVA was a product having a vinyl acetate content of 25%. The magnesium hydroxide was a synthetic product having an average secondary particle diameter of 0.48 μm. The magnesium hydroxide was surface-treated with 5 parts by weight, per 100 parts by weight of the magnesium hydroxide, of sodium palmitate before use Table 8 shows the results.

TABLE 8

| | Low temperature resistance | Surface whitening resistance | Melt Index | Flame retardancy UL94VE | |
|---|---|---|---|---|---|
| | Brittle temperature | Class | g/10 minutes | Thickness | Evaluation |
| Ex. 8 | −60° C. or lower | 3 | 1.1 | ⅛ | V-0 |
| CEx. 17 | −40° C. | 3 | 0.3 | ⅛ | non-standardized |

Ex. = Example, CEx. = Comparative Example

As shown in Table 8, the use of EVA resin produces grea improvement in all of flame retardancy, low-temperature resistance and melt index.

The resin compositions obtained in Examples 1 to 5 and Comparative Examples 1 to 14 were evaluated for expandability of their expansion-molded article as follows.

Azodicarbonamide as an expanding agent was added to pellets of a resin composition when the pellets were injection-molded, that is, the pellets were injection expansion-molded. The azodicarbonamide was used in an amount of 1.5 parts by weight per 100 parts by weight of the resin component (polypropylene) of the resin composition The above injection expansion molding was carried out at a temperature of 220° C., to obtain an expansion-molded article having a thickness of ¼inch.

The above expansion-molded article was cut and fractured and gas bubbles present in the fractured and cut surface were measured for sizes through a precision ruler, a magnifying glass or an optical microscope. In the expansion-molded articles of the resin compositions obtained in Examples 1 to 5 and Comparative Example 10, gas bubbles having a size of about 200 μm or smaller were uniformly found around a central place of the thickness of each. In the expansion-molded articles of the resin compositions obtained in Comparative Examples 1 to 9 and 11 to 14, many gas bubbles having a size of about 1 mm or smaller were found around a central place of the thickness of each, and gas bubbles having a size of 200 μm or smaller were scarcely found.

The resin composition obtained in Comparative Example 10 contained no flame retardant, and gas bubbles having a size of about 200 μm or smaller were uniformly found around the central place of the thickness.

According to the present invention, there is provided a halogen-free flame-retardant polyolefin-based resin composition which is greatly improved in melt index and can give a molded article which is almost free from a surface whitening phenomenon, improved in flame retardancy and greatly improved in low-temperature resistance. According to the present invention, there is provided a novel halogen-free flame-retardant polyolefin-based resin composition which can give a molded article suitable for use in a low-temperature environment such as a cold district or an extremely cold district.

According to the present invention, there is provided an expansion-molded article of a halogen-free flame-retardant polyolefin-based resin composition, which molded article has uniform and fine gas bubbles without gas bubbles having a large size.

What is claimed is:

1. A low-temperature-resistant halogen-free flame-retardant polyolefin-based resin composition containing
   (a) 100 parts by weight of a polyolefin resin,
   (b) 15 to 250 parts by weight of a dihydric or trihydric metal hydroxide surface-treated with a saturated fatty acid having 10 to 30 carbon atoms or an alkali metal salt thereof, or, when the metal hydroxide is aluminum hydroxide, 15 to 250 parts by weight of aluminum hydroxide surface-treated with a saturated or unsaturated fatty acid having 10 to 30 carbon atoms or an alkali metal salt thereof, and
   (c) 0.5 to 10 parts by weight of an aluminum salt of an unsaturated fatty acid having 10 to 30 carbon atoms.

2. A composition according to claim 1, wherein the metal hydroxide has an average secondary particle diameter of 0.1 to 10 μm.

3. A composition according to claim 1, wherein the metal hydroxide is a product surface-treated with 0.1 to 10 parts by weight, per 100 parts by weight of the metal hydroxide, of a fatty acid or the alkali metal salt thereof.

4. A composition according to claim 1, wherein the composition further contains not more than 30 parts by weight of a flame retardant aid selected from the group consisting of a carbon powder, a phosphorus-containing compound, a transition metal compound, an acrylic fiber and a novoloid fiber.

5. A composition according to claim 1, wherein the dihydric or trihydric metal hydroxide is at least one member selected from the group consisting of magnesium hydroxide, aluminum hydroxide, calcium hydroxide and calcium aluminum hydrate.

6. A composition according to claim 5, wherein the dihydric or trihydric metal hydroxide is a composite metal hydroxide in which a metal atom selected from the group consisting of nickel, cobalt, manganese, iron, copper and, Zinc is dissolved in the metal hydroxide recited in claim 5.

* * * * *